United States Patent [19]
Lau et al.

[11] Patent Number: 5,682,515
[45] Date of Patent: Oct. 28, 1997

[54] LOW POWER SET ASSOCIATIVE CACHE MEMORY WITH STATUS INHIBIT OF CACHE DATA OUTPUT

[75] Inventors: William Lau, Dallas; Douglas Parks Sheppard, Southlake, both of Tex.

[73] Assignee: Benchmarq Microelectronics, Inc., Dallas, Tex.

[21] Appl. No.: 664,319

[22] Filed: Jun. 10, 1996

Related U.S. Application Data

[63] Continuation of Ser. No. 8,207, Jan. 25, 1993, abandoned.

[51] Int. Cl.$^6$ ............................................. G06F 12/00
[52] U.S. Cl. ...................................... 395/455; 395/471
[58] Field of Search ................................. 395/455, 471

[56] References Cited

U.S. PATENT DOCUMENTS

| | | | |
|---|---|---|---|
| 4,493,026 | 1/1985 | Olnowich | 395/471 |
| 4,803,621 | 2/1989 | Kelly | 395/405 |
| 4,870,622 | 9/1989 | Aria et al. | 365/230.02 |
| 4,894,770 | 1/1990 | Ward et al. | 395/455 |
| 4,910,656 | 3/1990 | Scales, III et al. | 395/471 |
| 4,926,385 | 5/1990 | Fujishima et al. | 365/230.03 |
| 4,928,239 | 5/1990 | Baum et al. | 395/463 |
| 4,930,106 | 5/1990 | Danilenko et al. | 365/189.01 |
| 4,933,835 | 6/1990 | Sachs et al. | 395/450 |
| 4,933,837 | 6/1990 | Freidin | 395/452 |
| 4,939,641 | 7/1990 | Schwartz et al. | 395/473 |
| 4,953,164 | 8/1990 | Asakura et al. | 371/40.1 |
| 5,018,061 | 5/1991 | Kishigami et al. | 395/403 |
| 5,019,971 | 5/1991 | Lefsky et al. | 395/250 |
| 5,185,878 | 2/1993 | Baror et al. | 395/450 |
| 5,210,845 | 5/1993 | Crawford et al. | 395/455 |
| 5,210,849 | 5/1993 | Takahashi et al. | 395/471 |

OTHER PUBLICATIONS

Cache Tutorial, *Intel Corporation*, 1990.

*Primary Examiner*—Matthew M. Kim
*Assistant Examiner*—Reginald G. Bragdon
*Attorney, Agent, or Firm*—Gregory M. Howison

[57] ABSTRACT

A four-way cache data memory is provided, having a cache data RAM (30) and a tag RAM (28). The tag RAM (28) is enabled to access one of the tags therein. This tag is compared with the tag portion of the received memory address to determine if a tag is stored therein. If a true comparison results, a HIT is indicated and this is utilized to enable a portion of the cache data RAM (30). The data in the enabled portion is then output on the data bus. Additionally, the data output of the cache data RAM (30) is inhibited unless it is determined that the cache data stored in the cache data RAM (30) is valid, this information stored in a status RAM (62).

17 Claims, 5 Drawing Sheets

LOW POWER SET ASSOCIATIVE CACHE MEMORY WITH STATUS INHIBIT OF CACHE DATA OUTPUT

This application is a Continuation of application Ser. No. 08/008,207, filed Jan. 25, 1993, now abandoned.

TECHNICAL FIELD OF THE INVENTION

The present invention pertains in general to cache memories, and more particularly, to a cache memory that operates in a low power mode by selecting only the portions of the cache memory needed to perform certain operations in order to reduce power consumption.

BACKGROUND OF THE INVENTION

Cache memories have typically been utilized to provide an intermediate storage area for block of memory between the central processing unit and the slower main memory. By utilizing the faster cache memory to provide this intermediate storage, an overall faster operating speed can be achieved. Additionally, the more expensive and more power consuming cache memory is of significantly lower density than the lower power, lower speed main memory. However, the power consumption of the cache memory has been a disadvantage in battery powered personal computing products.

In battery powered personal computing products, it is desirable to provide a cache memory in order to speed processing time, especially for programs that are memory intensive; i.e., those that require access to data stored on the disk. In fact, some microprocessors have a built in cache memory which is an important aspect of the microprocessor. When power is not a concern, there is no problem. However, in battery operated systems, this presents a significant problem. Of course, the cache can be turned off to reduce this power. Further, some cache memory has been employed to reduce the amount of access to the disk, wherein the disk is turned off during this time. Unfortunately, the power savings due to the reduction in power consumption by the disk through use of the cache memory is typically overshadowed by the power consumption of the cache memory itself. The reason for this is that cache memories typically utilize Static Random Access Memory (SRAM) as opposed to Dynamic Random Access Memory (DRAM). The SRAM-based systems consume significant power to maintain storage without entering a refresh cycle.

SUMMARY OF THE INVENTION

The present invention disclosed and claimed herein comprises a cache memory that includes a tag address memory and a cache data memory. A tag address memory is operable to store a plurality of tags at addressable locations therein. The tags each comprise a portion of a memory address with the addressable locations addressable with a line address that comprises a portion of the memory address not included in the tag portion of the memory address. The tag addressing device is operable to receive the line address portion of a received memory address and access one of the addressable locations in the tag address memory to output a tag stored thereat. A hit circuit compares the tag portion of the received memory address with the accessed tag from the tag address memory. A hit indication signal is generated when a true comparison is made. The cache data memory is operable to store cached data in a plurality of addressable locations corresponding to the addressable locations in the tag memory. The addressable locations in the cache data memory are addressable with the line address. An enabling device is operable in response to the presence of the hit indication signal to activate the cache data memory such that, when activated, the cache data memory is responsive to receiving the line address and accessing the stored cache data at one of the accessible locations associated with the line address. In another aspect of the present invention, a status memory is provided for storing in a plurality of storage locations status values. The status values are associated with each tag in the tag address memory and, correspondingly, with each data value stored in the cache data memory. The status memory is addressed by the line address to output the status value associated with the accessed tag. An output inhibiting device is operable to inhibit accessed data from being output from the cache data memory unless the hit indication signal is generated for the accessed tag and the associated status value indicates the valid cache data in the corresponding location in the cache data memory.

In yet another aspect of the present invention, the cache data memory is a set associative memory with a plurality of ways. The tag address memory has the tags organized in ways such that for each way in the cache data memory a corresponding way is provided for in the tag address memory. A single line address will access tags from each of the ways to provide an accessed tag for each way. A comparator is provided for each of the accessed tags to compare the accessed tags to the received tag. Only one hit can result therefrom, this enabling only the one of the ways in the cache data memory associated with the hit. In this manner, power consumption is reduced in the cache data memory.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
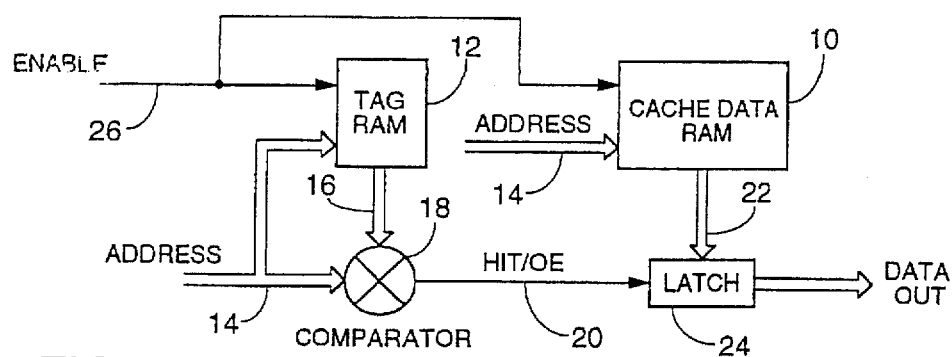
FIG. 1 illustrates a block diagram of the conventional prior art set associative cache system.

Referring now to FIG. 1, there is illustrated a block diagram of a prior art cache data memory. In accordance with the general operation of a cache memory, predetermined data is stored in a cache data memory 10 which is typically a Random Access memory (RAM) 10. The data stored in the cache data RAM 10 represents blocks of data that were recently accessed from a main memory (not shown). When a Central Processing Unit (CPU) accesses data from a main memory, this data is also stored in the cache data RAM 10. Upon again accessing data, the CPU first looks in the cache data RAM 10 to see if the data is stored there. If the data had recently been accessed, this data will be stored therein and the CPU will access the data from the cache data RAM 10 and not the main memory. Numerous advantages are provided for accessing the data from the cache data RAM 10 in that the cache data RAM 10 is typically comprised of Static Random Access Memory (SRAM) cells, which have a considerably faster access time than typical main memory which utilizes a combination of hard disk storage and Dynamic Random Access Memory (DRAM). Further, during the time that hard disk storage is not being accessed, it is typically turned off to reduce power consumption in battery powered systems.

In order to access data stored in the cache data RAM 10, a portion of the address associated with each of the words stored in the cache data RAM 10 are stored in a tag RAM 12 as a "tag", the tag RAM storing only this upper portion of the address. The address is input on an address bus 14, the lower order bits defining a line address and accessing predetermined storage locations in the tag RAM 12. As described above, the accessed data from the tag RAM 12 will represent the tag associated with the data stored in the cache data RAM 10. The accessed tag or tags are output on an output bus 16 and input to a comparator 18. The tag on the address bus 14 is then compared to the accessed tag on the bus 16 with the comparator 18. The comparison results are indicated by a HIT, which is output on a line 20. At the same time, the cache data RAM 10 is also accessed with the low address from the address bus 14. However, the data output from the cache data RAM 10 on a data bus 22 is not output to the main memory until it is indicated that this is a valid hit. When a valid hit is determined, the line 20 activates an output latch 24 to output the data therefrom. Additionally, the system is initialized with an enable signal on an enable line 26 which is operable to enable both the tag RAM 12 and the cache data RAM 10. Therefore, in operation, the tag RAM 12 and the cache data RAM 10 are initially activated. When addressed, the respective selected row is accessed in both the tag RAM 12 and the cache data RAM 10. Since both incorporate static random access memory, this means that all cells therein are accessed and draw current. As is well known, when static random access memory cells are accessed, current is drawn through one side of the cell. Also, significant power savings are realized by not activating the supporting peripheral circuitry, which draws power in a transient manner.

Figure 2:
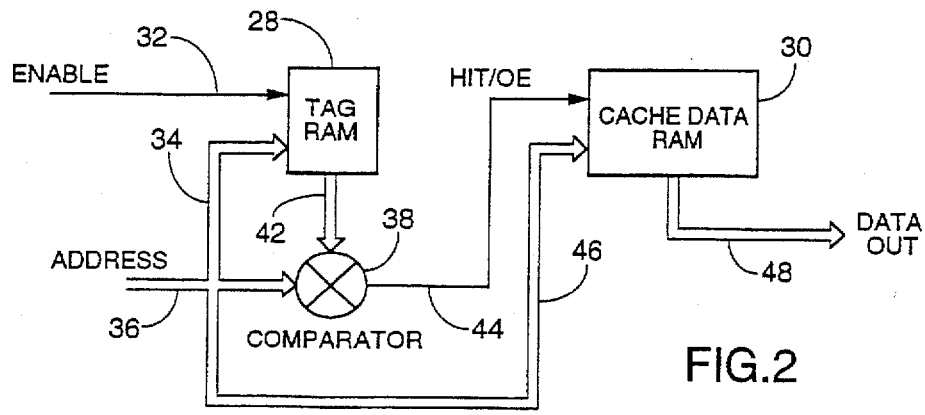
FIG. 2 illustrates a block diagram of the set associative cache memory of the present invention.

Referring now to FIG. 2, there is illustrated a block diagram of the cache data memory of the present invention. The cache data memory includes a tag RAM 28 and a cache data RAM 30, each comprised of SRAM memory cells in the preferred embodiment. However, the cache data RAM 30 is enabled separately from the tag RAM 28, the tag RAM 28 enabled by the enable line 32. The tag RAM 28 is operable to receive on an address input bus 34 the lower bit portion of the address, the line address, the main memory address input on an address bus 36. The upper portion of the address, the tag, is input to one input of a comparator 38, the other input comprising the output of the tag RAM 28. Tag RAM 28 operates substantially similar to the tag RAM 12 of FIG. 1 in that whenever the memory location in the tag RAM 28 is addressed by the line address on bus 34 a tag is output on an output bus 42 to the comparator 38 when this tag is identical to the tag on bus 36, this yields a HIT on an output line 44 from the comparator 38. This HIT is utilized to enable the cache data RAM 30, which is also addressed by the line address, which is received on an input address bus 46. As will be described in more detail hereinbelow, the cache data RAM 30 is organized as a four-way set associative cache with four separate "ways", each way comprising a block of memory. Only the block of memory associated with the way that resulted in a hit output by the tag RAM 28 will be enabled. This allows only the memory cells associated with that block to be activated, resulting in a significant power reduction. The accessed data is then output on a data output bus 48 for interface with the main system data bus.

In the operation of the embodiment of FIG. 2, it can be seen that the system operates in a serial configuration. In this manner, the tag RAM 28 is enabled by an enable line 32 and the line address on the address bus 34. However, at this time, the cache data RAM 30 is not enabled and does not draw power. This does not occur until a HIT is determined, which operation occurs after the tag RAM 28 is enabled. This, in effect, staggers the time at which the memory cells are turned on.

Figure 3:
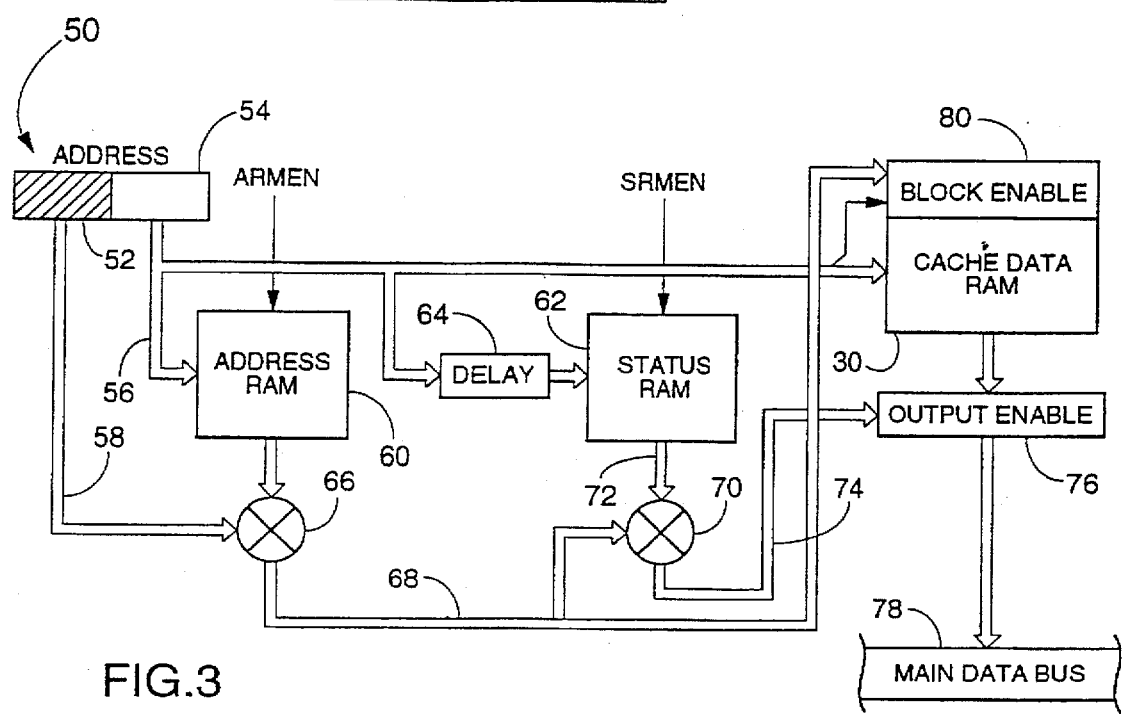
FIG. 3 illustrates a more detailed block diagram of the cache memory system of FIG. 2.

Referring now to FIG. 3, there is illustrated a more detailed block diagram of the cache memory. The address is represented by a block 50 that is divided into two portions, an upper portion 52 representing the tag and a lower portion 54 representing the line address. The line address is output on a bus 56 and the tag is output on a bus 58. The tag RAM 28 is comprised of an address RAM 60 and a status RAM 62. The address RAM 60 is comprised of four blocks, one block for each way in the four-way set associative cache. Each of the blocks is arranged in a 512×13 format. The status RAM 62 is comprised of a single block which is arranged in a 512×7 format. The status RAM 62 contains valid bits and LRU bits. The valid bits basically determine whether a given line in the addressable memory space of the address RAM 60 for a given way is valid. Therefore, each block in the address RAM 60 for a given line has one status bit associated therewith. Additionally, each line in each block of the address RAM 60 will also have associated therewith a bit indicating Write priority, this being referred to as a Least Recently Used (LRU) algorithm. With this type of algorithm, data is only written to the one of the blocks have the oldest data associated therewith. This is a conventional algorithm, The address RAM 60 is addressed by the line address on the bus 56 and in association with an enable signal ARMEN. Similarly, the status RAM 62 is also addressed by the line address and an enable signal SRMEN. However, a delay 64 is provided between the address bus 56 and the address input of the status RAM 62. The reasons for this will be described hereinbelow.

The output of the address RAM 60 is input to a comparator 66, the comparator 66 operable to compare the tag output by the address RAM 60 with the tag on the address bus 58. The main memory address in the block 50 is 24 bits in width, the tag comprising twelve-bits and the line address 52 comprising a nine-bit index and three bits that allow access of the data within a given accessed portion of the cache data RAM 30. This will be described in more detail hereinbelow.

The output of the comparator 60 comprises a four-bit wire bus 68, each wire indicating a hit for each one of the ways in the four-way set associative cache. The four-wire bus 68 is input to a comparator 70, the other input thereof comprising the output of the status RAM 62, which is output on a bus 72. The comparator 70 is operable to compare the status bit for a given way with the existence of a hit. This will yield an output for each way only if both a hit is present and a valid status bit is present. The comparator 70 therefore operates in an exclusive OR function. The output of the comparator 70 is a four-wire bus which comprises four valid-bits, each valid-bit being input to an output enable circuit 76, which output enable circuit 76 is disposed between the output of the cache data RAM 30 and a main data bus 78. Therefore, even though the cache data RAM 30 is accessed, data will not be output unless the data is in fact valid, as indicated by the contents of the status RAM 62.

The cache data RAM 30 is comprised of eight blocks, two blocks for each way. Each of the ways is formatted in a 512×64 configuration. Each of the eight blocks is accessible through a block enable circuit 80, which block enable circuit 80 also receives one bit of the line address on the address bus 56 to allow selection of one of two blocks for each way.

In operation, it can be seen that the address RAM 60 is first enabled, with the status RAM 62 and the cache data RAM 30 remaining in a non-enabled mode. When a hit is determined, the cache data RAM 30 is enabled to allow access to the data stored therein. Power is conserved by not allowing the cache data RAM 30 to be enabled prior to a hit being determined. However, a further aspect of the invention is that the cache data RAM 30 can be enabled prior to a determination being made as to whether there is actually a valid status bit for the accessed data in the cache data RAM 30. This allows the cache data RAM 30 to be accessed prior to a determination of the data being valid.

Figure 4:
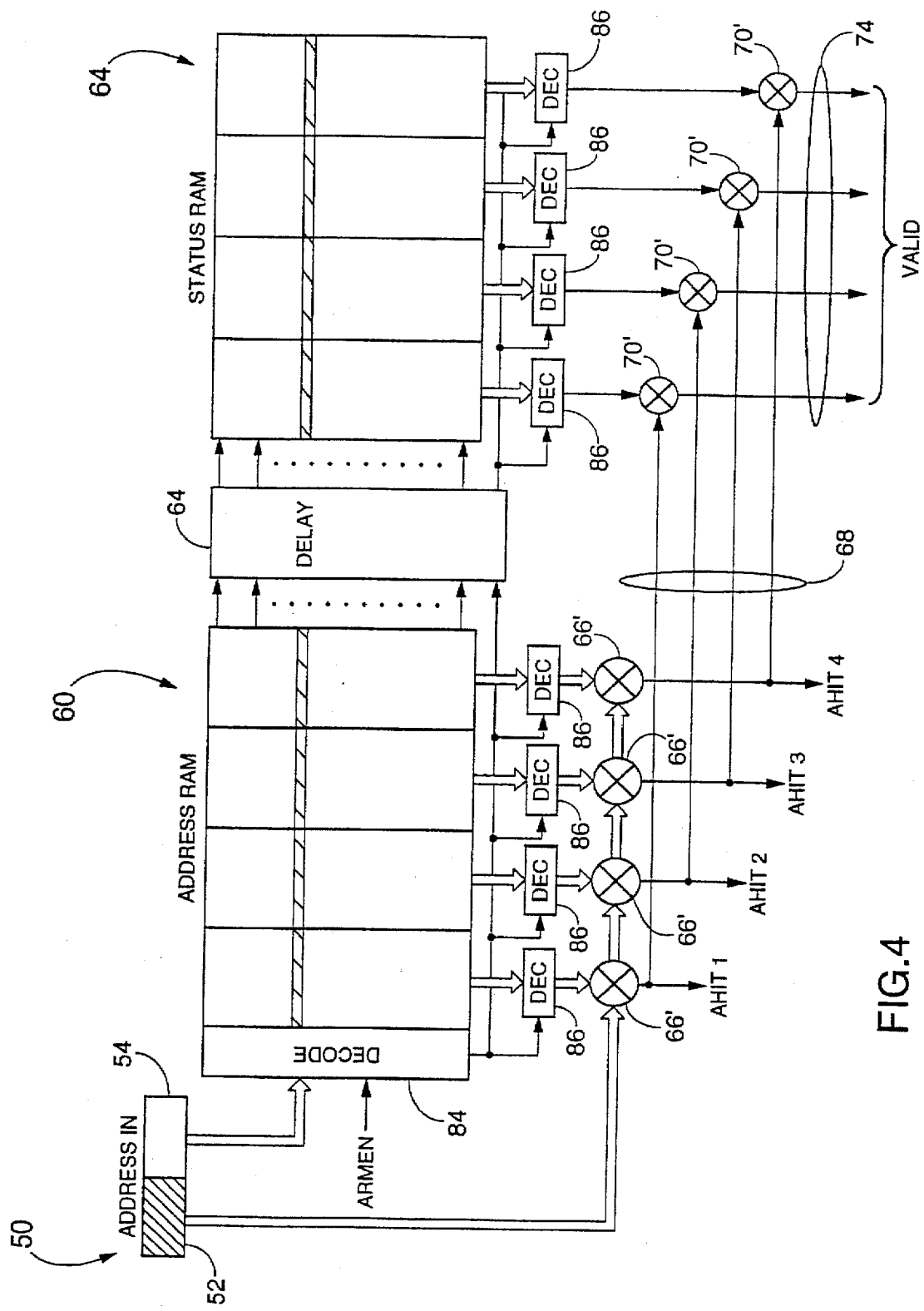
FIG. 4 illustrates a detailed block diagram of the tag portion of the cache memory of the present invention.

Referring now to FIG. 4, there is illustrated a detailed diagram of the address RAM 60 and the status RAM 62, which comprise the tag RAM 28. The address RAM 60 is comprised of four blocks, each representing one of the ways in the four-way set associative architecture. Each of the ways is in a 512×13 configuration. Therefore, there are 512 lines for each block. This therefore allows 512 tags to be stored in each of the blocks. A decoder 84 is provided that receives the line address from the portion 54 of the address block 50 to access select ones of the lines. Additionally, each of the block in the address RAM 60 has associated on the output thereof a second level of decoding 86, such that the line address selects one of the tags in each of the blocks for output therefrom. Each of the addressed tags from each of the blocks in RAM 60 are then input to one of four comparators 66'. Each of the comparators 66' outputs a single-bit indicating a HIT, labelled "ahit1", "ahit2", "ahit3" and "ahit4". These comprise the bus 68.

The status RAM 62 has also been divided into four regions with there essentially being one accessed block which is organized in a configuration of 512×7. Four bits represent the valid bits, one for each way, and three bits represent the LRU bits for the Write algorithm, which is not the subject of the present invention. The status RAM 62 has 512 lines, the same number as the address RAM 60. Therefore, the same decode lines that are output by the decoder 84 to address lines in the address RAM 60 are also substantially the same lines that address lines in the status RAM 62. However, the delay 64 is interposed between the address lines such that the delay circuit receives on the input thereof 512 input lines and provides on the output thereof 512 delayed output lines. Additionally, the output is subject to another level of decoding represented by decoders 86 similar to the decoders 86 associated with the address RAM 60. The output of each of the valid bits from the status RAM 62 is input to one of four comparators or exclusive OR circuits 70', the other input thereof received from the bus 68. Therefore, whenever there is a hit and a valid status bit associated with that particular tag in the address RAM 60, the associated output from the circuit 70' will be high, indicating that it is valid. This valid output is represented by the bus 74, which bus 74 is input to the output enable circuit 76 in FIG. 3.

Figure 5:
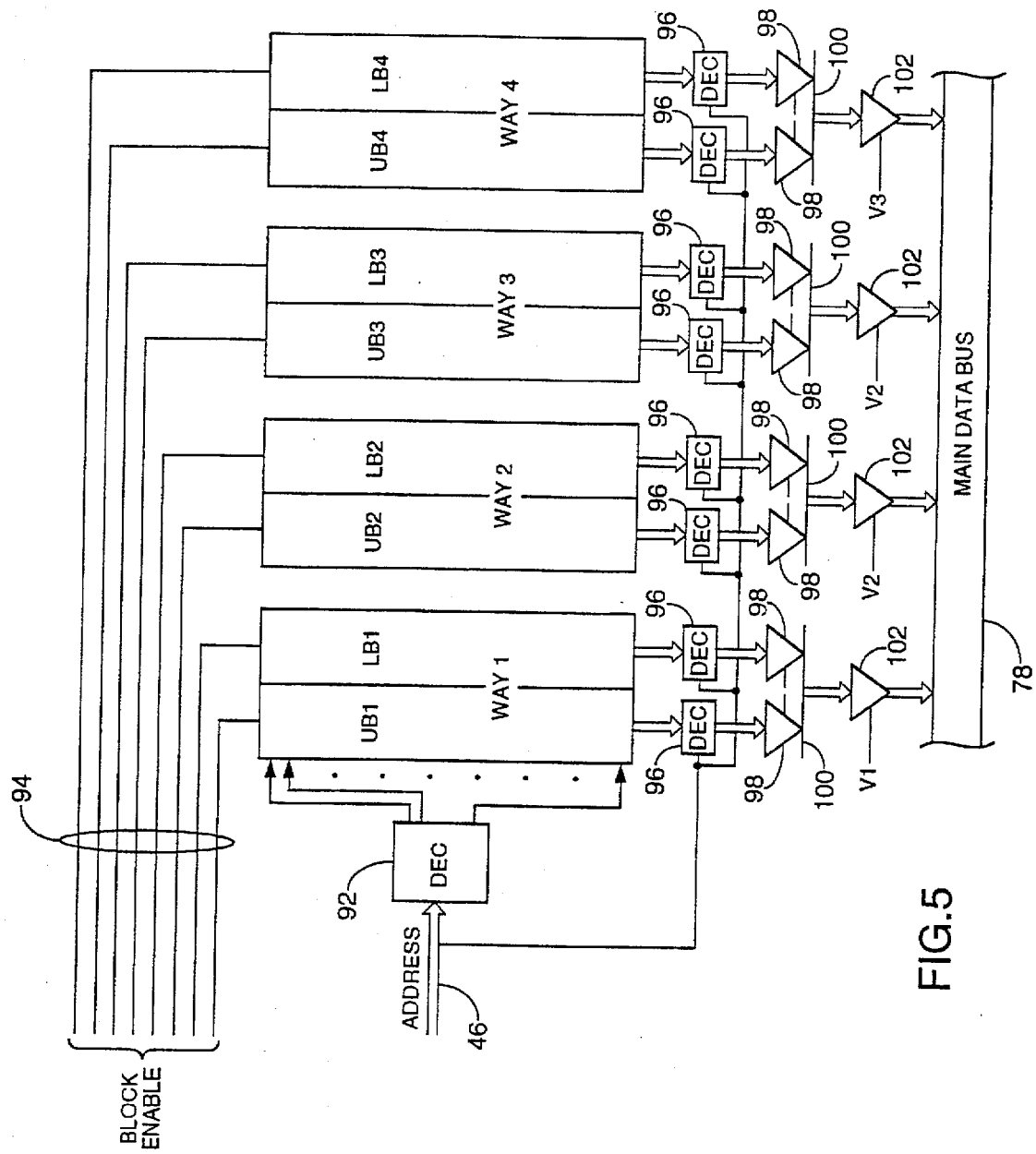
FIG. 5 illustrates a detailed block diagram of the cache data portion of the cache memory of the present invention.

Referring now to FIG. 5, there is illustrated a detailed block diagram of the cache data RAM 30 and the associated block enable 80. The line address is received on the bus 46 and a portion thereof is input to an address decode circuit 92. The address decode circuit 92 outputs address lines therefrom, one for each line in the array, each of these lines corresponding to a line in both the status RAM 62 and the tag address RAM 60. The array is divided into four ways, each way representing one way in the four-way set associative architecture, and each way mappable into a page in the main memory in accordance with conventional techniques. Each of the ways is divided into two blocks, an upper block UB and a lower block LB. For way one, this is UB1 and LB1, for way two, this is UB2 and LB2, for way three, this is UB3 and LB3 and, for way four, this is UB4 and LB4. Each of the blocks for each of the ways is accessible by block enable select signals that are received from a group of eight lines 94 that are output by the block enable circuit 90. The block enable circuit 90 is operable to receive the four hit signals on the bus 68 and, with one of the addresses on the address bus 56, is operable to select whether the block is a UBx or the LBx. However, rather than utilizing eight blocks, four blocks could be utilized, and then only the four hit signals on the line 68 would be required in order to enable the block. However, it can be seen that only one of eight blocks is accessed after determining that a hit is present. In this manner, the associated memory cells for the addressed line in the array will not be selected for the non-enabled blocks.

The outputs of each of the blocks are output to a second level of decoding 96, which selects two of eight bytes that are accessed from the block in the first step of decoding. These are input to line drivers 98, the output of which is wire ORed to a bus 100. Each of the line drivers 98 is enabled by the associated one of the Block Enable lines 94. The bus 100 is then input to a gate 102, there being one gate 102 for each of the ways in the four-way set associative architecture. Each of the gates 102 is controlled by one of the four valid bits output on the bus 74, such that, even though one of the blocks associated with any of the ways is accessed due to a hit, it can only be output to the main data bus 78 if a valid bit for that particular way was generated, as described hereinabove.

Each of the lines in each of the ways has associates therewith four 16-bit words, each two bytes in length, noting that each line in WAY1–WAY4 operates as two lines. Therefore, all data for a given line in a given way for a given received line address will be accessed and output from that way. This is advantageous in that a subsequent step of decoding can be eliminated such that all four 16-bit data words could be output and buffered for the accessed line. This is useful in that a processor on the next data access step has a high probability of requesting the next sequential data word. However, the preferred embodiment utilizes the decoder 96 to select only one of these words for output therefrom.

Figure 6:
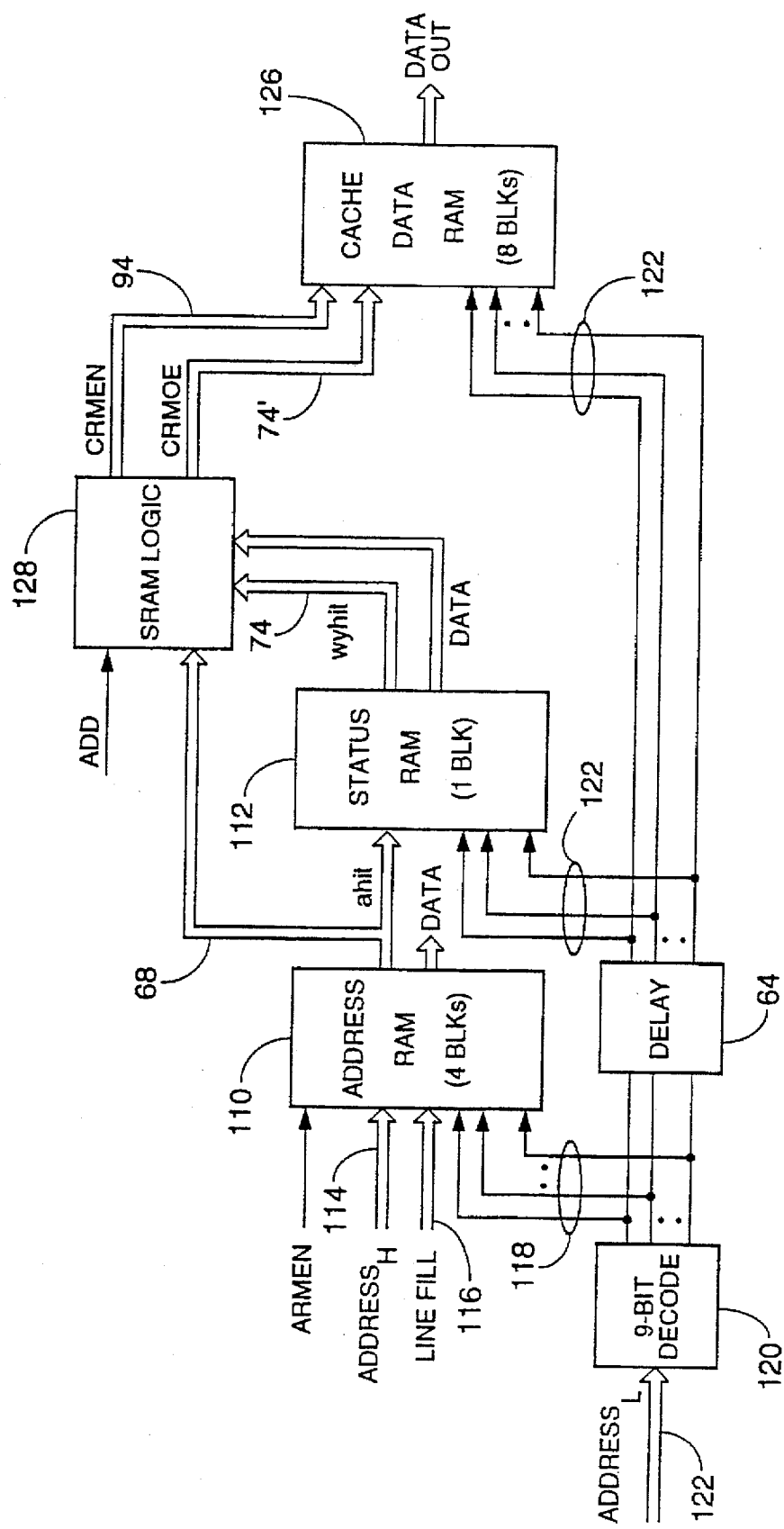
FIG. 6 illustrates an overall layout diagram of the cache memory of the present invention.

Referring now to FIG. 6, there is illustrated a block diagram of the general layout of the cache memory of the present invention. A separate RAM 110 is provided for the address RAM, this providing four blocks with a configuration of 512×13 per way, this allowing for 2048 tags to be stored. The address RAM 110 includes the hit circuitry therewith. A circuit 112 is provided for the status RAM, this providing a single block which has a configuration of 512×7. This includes the compare circuitry. The address RAM block 110 receives the tag on a bus 114 in addition to the address enable signal ARMEN. Additionally, a line fill address is received on the bus 116, this being utilized in the Write operation which is not described herein. The tag bits on bus 114 is utilized for the compare operation. The address operation is achieved through address lines 118 that are received from a nine-bit decode circuit 120. The nine-bit decode circuit 120 receives on the input thereof the line address on a bus 122. The nine-bit decode circuit decodes the line address to output the appropriate lines for use by the address RAM in the circuit 110. Although not illustrated, some decoding is done inside of the address RAM circuit 110.

The address RAM circuit 110 outputs the four hit signals ahit1–ahit4 on the bus 68. These are input to the status RAM circuit 112 and utilized to generate the valid bits on the line 74, which are referred to as WYHIT signals, there being four. The status RAM circuit 112 receives address input lines 122, which are output from the delay circuits 64. These lines 122 are also input to a cache data RAM circuit 126.

The output of the address RAM circuit 110 on the bus 68 are input to an SRAM logic circuit 128, in addition to WYHIT lines on lines 74 and also the data output by the status RAM circuit 112, which is output on a data bus 130. The SRAM logic circuit 128 is operable to generate the timing signals to the cache data RAM 126 and provide some of the block enable function 80. The four HIT bits in addition to one address bit from lower order addresses are utilized to generate the eight block enable signals on the block enable lines 94, these referred to as the CRMEN signals. The valid bits on the line 74 are conditioned with respect to time and output on line 74' and labelled CRMOE to provide the output enable function to the cache data RAM circuit 126. Therefore, it can be seen that the address decode operation occurs in multiple stages, some decoding provided by the nine-bit decode circuit 120 and some decode operation internally generated. However, any type of decode can be utilized, these being conventional techniques.

Figure 7:
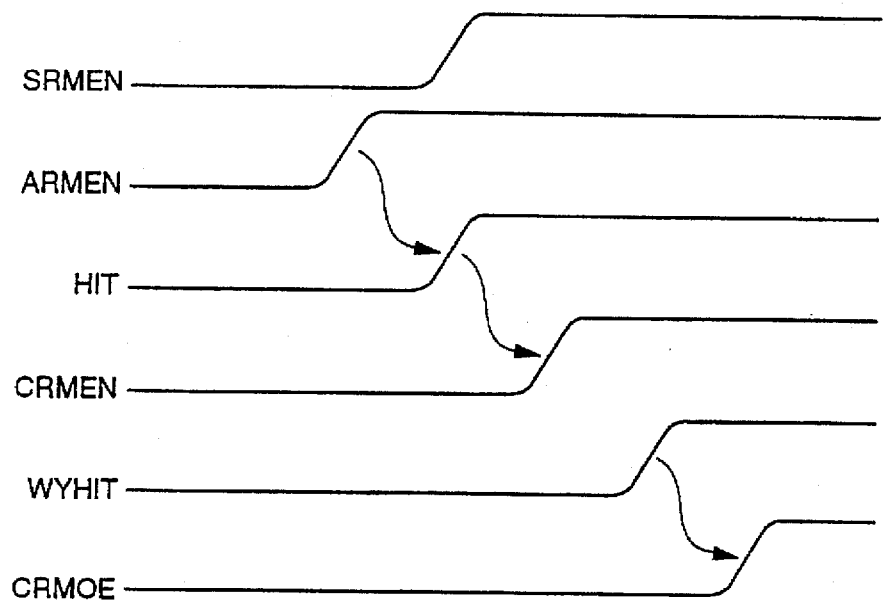
FIG. 7 illustrates a timing diagram for the serial operation of the cache memory of the present invention.

Referring now to FIG. 7, there is illustrated a timing diagram for the sequence of operation that generate the enable signal. The ARMEN signal is utilized to enable the address RAM which is then operable to process the address, compare the addressed tags with the tag portion of the address block and generate a HIT signal. When a HIT signal occurs, the HIT signal then initiates the generation of the cache data memory enable signal CRMEN. This is therefore a serial operation wherein the address RAM is first initialized and then the cache data RAM memory initialized. Additionally, the enable signal for the status RAM is also enabled at a later time than the address RAM. This is due to the fact that the HIT determination must be made before data can be accessed from the cache data memory. Further, the generation of the signal WYHIT indicating the presence of a valid status bit for the accessed block in the cache data memory is generated after the cache data memory is accessed. This results in generation of the output enable signal CRMOE.

Figure 8:
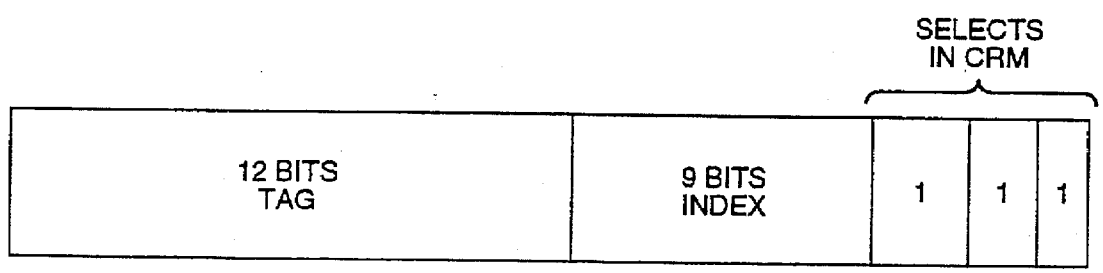
FIG. 8 illustrates a map of the address bits in the main memory address of the present invention.

Referring now to FIG. 8, there is illustrated a detailed diagram of the address block 50. It can be seen that twelve-bits of the address are dedicated to the tag and nine-bits to the index with the three LSBs operable to allow for selection of one of the eight byte words in the cache data RAM. This is a conventional architecture. However, it should be understood that other addressing schemes could be utilized and their associated decoding schemes.

In summary, there has been provided a cache memory that provides for reduced power consumption. The cache memory utilizes a set associative structure that has at least two ways, with a cache data memory and an address memory. The cache data memory has two blocks for each way, each block being separately enabled. The address memory has a corresponding structure with four separate blocks, one each for each of the ways in the cache data memory, the address memory storing a tag. The address memory is enabled separately from the cache data memory such that a HIT is first determined prior to enabling of the cache data memory. This provides for a serial operation. Additionally, when enabling the cache data memory, only the one of the blocks in which the data is determined to be stored is enabled. A Status RAM is also provided that is operable to store status values associated with each of the addressable locations in the cache data RAM. The status value for the addressed location in the cache data RAM is compared to the associated HIT output and the output of the cache data RAM enabled only if the status value indicates valid data in the cache data RAM.

Although the preferred embodiment has been described in detail, it should be understood that various changes, substitutions and alterations can be made therein without departing from the spirit and scope of the invention as defined by the appended claims.

What is claimed is:

1. A cache memory, comprising:

a tag address memory for storing a plurality of tags at addressable locations therein, which tags each comprise a portion of a memory address, said memory address having a tag portion and a line address portion, said addressable locations organized on a plurality of lines, each of said lines of said addressable locations addressable with said line address portion;

a tag addressing device for receiving said line address portion of a received memory address as a received line address and for addressing a select one of said tags in said addressable locations in said tag address memory with said received line address, said tag addressing device addressing said select one of said tags for output thereof;

a hit circuit for comparing said tag portion of said received memory address with said accessed select one of said tags and generating a hit indication signal when a true comparison is made;

a cache data memory for storing cache data in a plurality of addressable locations corresponding to said addressable locations in said tag address memory, said addressable locations addressable with said received line address, said cache data memory operating in an enabled mode to allow access to said addressable locations therein, and in a disabled mode to conserve power;

a status memory having a plurality of addressable locations corresponding to each of said addressable locations in said tag address memory and said cache data memory, and each for storing a status value associated therewith, said status value providing an indication as to whether data stored in said corresponding addressable locations in said cache data memory is valid cache data, said addressable locations addressable by said line address portion of said memory address;

a status memory addressing device for addressing said addressable locations in said status memory with said received line address and for outputting said accessed status value;

an enabling device operable in response to the presence of said hit indication signal to place said cache data memory in said enabled mode after the addressing operation of said tag addressing device such that, when enabled, said cache data memory is responsive to receiving said received line address and accessing said stored cache data at the one of said addressable locations associated with said received line address; and an output inhibiting device for inhibiting said accessed cache data from being output from said cache data memory unless said hit indication signal is generated and said associated accessed status value indicates valid cache data in said corresponding location in said cache data memory, wherein said enabling device initiates operation prior to access of said status value from said status memory such that said output inhibiting device inhibits output of said accessed data from said cache data memory until said status value is accessed.

2. The cache memory of claim 1, wherein said status memory further comprises a status memory enabling device for enabling access to said status memory a predetermined period of time after said tag address memory is accessed.

3. The cache memory of claim 1, wherein said cache data memory is comprised of static random access memory, which operates in said disabled mode when said enabling device does not enable said cache data memory to reduce power and, in said enabled mode, when said enabling device enables said cache data memory, to consume more power and to access said stored cache data for output therefrom.

4. The cache memory of claim 1 wherein:

said cache data memory is a set associative memory having m ways and said tag address memory is organized into m corresponding ways, with tags stored in each of said ways in said tag address memory corresponding to cache data stored in each of said corresponding ways in said cache data memory and wherein;

said tag addressing device is operable to address an addressable location for each of said ways for a given received line address and outputting m tags for each received line address;

said hit circuit is operable to compare each of said m tags accessed from said tag address memory by said tag addressing device with said tag address portion of said received memory address and generate one of m hit indication signals, one associated with each of said ways and only one of which will be generated when a true comparison is made with one of said m accessed tags; and said enabling device operable to output only data from one of said ways in said cache data memory that is associated with one of said ways in said tag address memory which is associated with said generated hit indication signal.

5. The cache memory of claim 4, and further comprising, a way select device for allowing enabling of only the one of said ways in said cache data memory associated with said hit indication signal.

6. The cache memory of claim 4, wherein said enabling device is operable to inhibit access to ones of said addressable locations in said cache data memory associated with said received line address and not associated with said generated hit indication signal.

7. A set associative cache memory, comprising:

a tag address memory organized into m-ways for storing a plurality of tags at addressable locations therein, which tags comprise a portion of a memory address, said memory address having a tag portion and a line address portion, said addressable locations organized on a plurality of lines, each of said lines of addressable locations addressable with said line address portion and each of said lines of said addressable locations including addressable locations from each of said m-ways;

a tag addressing device for receiving said line address portion of a received memory address for addressing a select one of said tags in said addressable locations in each of said ways in said tag address memory with said received line address portion for access thereof, said tag addressing device accessing for output said select one of said tags;

a hit circuit for comparing each of said tags accessed from said tag address memory by said tag addressing device with said tag portion of said received memory address, there being m-tags accessed, and operable to generate one of m hit indication signals, one associated with each of said m ways and only one of which will be generated when a true comparison is made with one of said accessed tags;

a cache data memory for storing cache data in a plurality of addressable locations corresponding to said addressable locations in said tag address memory, said addressable locations of said cache data memory organized in m ways corresponding to the m ways of said addressable locations in said tag address memory, said addressable locations addressable with said line address portion, said cache data memory operating in an enabled mode to allow access to said addressable locations therein, and in a disabled mode to conserve power;

a status memory having a plurality of addressable locations corresponding to each of the addressable locations in said tag address memory and said cache data memory, and each for storing a status value associated therewith, said status value providing an indication as to whether data stored in said corresponding addressable locations in said cache data memory is valid cache data, said addressable locations addressable by said line address portion of said memory address;

a status memory addressing device for addressing said addressable locations in said status memory with said received line address portion and for outputting said accessed status value;

an enabling device operable in response to the presence of one of said m hit indication signals to inhibit enablement of ones of said addressable locations in said cache data memory not associated with said generated hit indication signal; and an output inhibiting device for inhibiting accessed cache data from being output from said cache data memory unless one of said hit indication signals is generated and said associated accessed status value indicates valid cache data in the corresponding location in said cache data memory, wherein said enabling device initiates operation prior to access of said status value from said status memory such that said output inhibiting device inhibits output of said accessed cache data from said cache data memory until said status value is accessed.

8. The cache memory of claim 7, wherein said enabling device is operable in response to the presence of a generated one of said hit indication signals to enable only the addressable locations associated with the received line address portion and an associated one of said ways in said cache data memory.

9. The cache memory of claim 7, wherein said enabling device inhibits accessing stored cache data from said cache data memory until one of said m hit indication signals is generated.

10. The cache memory of claim 7, wherein said cache data memory is comprised of static random access memory, which operates in said disabled mode when said enabling device does not enable said cache data memory to reduce power and, in said enabled mode, when said enabling device enables said cache data memory, to consume more power and to access said stored data for output therefrom.

11. The cache memory of claim 10, wherein said enabling device is operable in response to the presence of a generated one of said hit indication signals to enable only the addressable locations associated with the received line address portion and an associated one of said ways in said cache data memory.

12. The cache memory of claim 11, and further comprising a status memory enabling device for enabling access to said status memory a predetermined period of time after said tag address memory is accessed.

13. A method for caching data in a cache memory, comprising:

storing a plurality of tags at tag addressable locations in a tag address memory, which tags each comprise a portion of a memory address, the memory address having a tag portion and a line address portion, the addressable locations organized on a plurality of lines, each of the lines of addressable locations addressable with the line address portion;

receiving the line address portion of a received memory address as a received line address and addressing a select one of the tags in the addressable locations in the tag address memory with the received line address and outputting the select one of said tags;

comparing the tag portion of the received memory address with the accessed select one of the tags and generating a hit indication signal when a true comparison is made;

storing cache data in a plurality of addressable locations in a cache data memory, which addressable locations correspond to the addressable locations in the tag address memory, the addressable locations addressable with the received line address, the cache data memory operating in an enabled mode to allow access to the addressable locations therein, and in a disabled mode to conserve power;

storing a plurality of status values in corresponding storage locations in a status memory, each of the storage locations corresponding to each of the storage locations in the tag address memory and the cache data memory, respectively, each of the status values providing an indication as to whether the data stored in the corresponding addressable locations in the cache data memory is valid cache data, the addressable locations addressable by the line address portion of the memory address;

addressing the addressable locations in the status memory with the received line address and outputting the accessed status value;

enabling the cache data memory in response to the presence of the hit indication signal such that, when enabled, the cache data memory is responsive to receiving the received line address and accessing the stored cache data at the one of the addressable locations associated with the received line address; and inhibiting accessed cache data from being output from the cache data memory unless the hit indication signal is generated and the associated accessed status value indicates valid cache data in the corresponding addressable locations in the cache data memory, wherein the step of enabling the cache data memory enables operation of the cache data memory prior to access of the status value from the addressable locations in the status memory such that output of the accessed data from the cache data memory is inhibited until a status value is accessed indicating valid cache data.

14. The method of claim 13, and further comprising, enabling access to the status memory only after a predetermined period of time after the tag address memory is accessed.

15. The method of claim 13, wherein the cache data memory is a set associative memory having m ways and the tag address memory is organized into m corresponding ways, with tags stored in each of the ways in the tag address memory corresponding to cache data stored in each of the corresponding ways in the cache data memory and wherein:

the step of addressing the tag address memory comprises addressing an addressable location in the tag address memory for each of the ways for a given received line address and outputting m tags for each received line address;

the step of comparing compares each of the m tags accessed from the tag address memory by the step of addressing the tag address memory with the tag address portion of the received memory address and generating one of m hit indication signals, one associated with each of the ways and only one of which will be generated when a true comparison is made with one of the m accessed tags; and the step of enabling outputting only data from one of the ways in the cache data memory that is associated with one of the ways in the tag address memory which is associated with the generated hit indication signal.

16. The method of claim 15, and further comprising enabling only one of the ways in the cache data memory that is associated with the hit indication signal when the hit indication signal is generated.

17. The method of claim 15, wherein the step of enabling further comprises inhibiting access to addressable locations in the cache data memory associated with the received line address and not associated with the generated hit indication signal.

* * * * *